United States Patent [19]

Meiller et al.

[11] 4,125,242
[45] Nov. 14, 1978

[54] SPRING MOUNTED SEAT WITH HEIGHT ADJUSTMENT

[75] Inventors: Hermann Meiller; Heinz Daunderer, both of Amberg, Fed. Rep. of Germany

[73] Assignee: Messrs. Willibald Grammer, Amberg, Fed. Rep. of Germany

[21] Appl. No.: 766,911

[22] Filed: Feb. 9, 1977

Related U.S. Application Data

[63] Continuation-in-part of Ser. No. 613,938, Sep. 16, 1975, abandoned.

[30] Foreign Application Priority Data

Sep. 28, 1974 [DE] Fed. Rep. of Germany ....... 2246516

[51] Int. Cl.$^2$ ............................................ A45D 19/04
[52] U.S. Cl. ..................................... 248/399; 248/421
[58] Field of Search ........ 248/399, 400, 157, 421–423; 297/345–348

[56] References Cited

U.S. PATENT DOCUMENTS

| | | | |
|---|---|---|---|
| 3,085,778 | 4/1963 | Korn | 248/399 |
| 3,194,531 | 7/1965 | Langer | 248/421 |
| 3,285,562 | 11/1966 | Langer | 248/399 |
| 3,339,906 | 9/1967 | Persson | 248/399 X |
| 3,390,857 | 7/1968 | Nystrom | 248/399 |
| 3,599,232 | 8/1971 | Tabor | 248/400 X |
| 3,752,432 | 8/1973 | Lowe | 248/400 |
| 3,761,045 | 9/1973 | Sturhan | 248/399 |
| 3,826,457 | 7/1974 | Huot de Longchamp | 248/399 |
| 3,888,451 | 6/1975 | Lacey | 248/399 |
| 3,897,036 | 7/1975 | Nystrom | 248/399 |

FOREIGN PATENT DOCUMENTS

| | | | |
|---|---|---|---|
| 1,311,708 | 10/1962 | France | 248/399 |
| 537,098 | 6/1941 | United Kingdom | 248/421 |
| 774,129 | 5/1957 | United Kingdom | 248/399 |
| 930,903 | 7/1963 | United Kingdom | 248/399 |

*Primary Examiner*—Lawrence J. Staab
*Attorney, Agent, or Firm*—Marn & Jangarathis

[57] ABSTRACT

There is proposed a seat of adjustable height having a seat part coupled by a connecting element to a supporting lever acted upon by supporting spring means, the lever being swingable against the action of the supporting spring means by a load acting on the seat part. In order to enable easy height adjustment with a simple construction in such a seat the connecting element is adjustable relative to the supporting lever to change the height of the seat part and a locking device is provided by means of which the connecting element and the supporting lever can be locked in several different relative positions. To enable height adjustment without use of a special lever the locking device may be constructed to lock the connecting element and the supporting lever in a series of relative positions as the seat part is raised and when the seat part reaches an upper end position to set itself in a disengaged condition which is maintained until the seat part is lowered to a lower end position. A very useful supporting spring means may be obtained if the supporting lever has at its free end a run-up cam which acts upon a sliding element displaceable against the action of the supporting spring means such that when the seat is loaded the swing of the supporting lever is converted into a linear motion of the sliding element and tensions the spring means.

12 Claims, 4 Drawing Figures

SPRING MOUNTED SEAT WITH HEIGHT ADJUSTMENT

This application is a continuation-in-part of Ser. No. 613,938 filed Sept. 16, 1975 and now abandoned.

The invention relates to a seat, in particular a vehicle seat, of adjustable height having a seat part coupled by a connecting element to a supporting lever acted upon by supporting spring means, the lever being swingable against the action of the supporting spring means by a load acting on the seat part.

Various devices for adjusting the height of the seat part of seats quite generally, but especially of driver's seats, are known. With driver's seats, the general procedure is to provide for height adjustment purposes a special device mounted on the understructure producing the springing action or constructed below this understructure. This type of construction requires a relatively large over-all height, for which reason it cannot be employed in certain cases.

For the purpose of adjusting the height of the seat part of a driver's seat having a scissor-type understructure, it is furthermore known to vary the angle of two arms of a scissor, this arrangement being also intended to serve at the same time for varying the inclination. For setting different angles, a relatively complicated device is employed in each case, as a result of which the costs of manufacturing the seat understructure becomes comparatively high and susceptibility to trouble is increased. Furthermore, correct adjustment of the driver's seat generally creates difficulties, in particular also while travelling. In fact, in the known arrangements, a lever must always be operated to adjust the height of the seat and the driver of the vehicle, for example a motor bus or a motor lorry, generally only finds his lever by use of his eyes. This is naturally very dangerous.

The main object of the invention is to provide a seat, in particular a vehicle seat, having a height adjusting device, wherein the height adjusting device can be readily accommodated even with a relatively low height of the seat understructure and wherein the costs of fabrication can be kept as low as possible.

A further object is to design the seat in such a way that no special levers or the like have to be operated for height adjustment, so that without endangering driving safety the driver's seat can be adjusted, also while travelling, at least in one direction.

In order to overcome the above-described problems and regarding the objects there is proposed according to the invention a seat of the kind mentioned at the beginning of the specification, wherein the connecting element is adjustable raltive to the supporting lever to change the height of the seat part and a locking device is provided by means of which the connecting element and the supporting lever can be locked in several different relative positions.

Thus, the basic principle of the height adjusting device of the seat according to the invention is to achieve the variation in the height of the seat part proper in that the point of action of the supporting spring of the vehicle seat, which spring is present in any case, is varied and, consequently, the seat part is located at different heights in the extended position. It will be obvious that a locking device by means of which a connecting element, for example a simple lever, and the supporting lever for the spring can be engaged in various angular positions can be produced easily and at low cost. The supporting lever is present in any case in a large number of construction types.

In order to offer the possiblity of effecting adjustment of the seat height without operating any special lever, the use of a locking device is advantageous which is constructed to lock the connecting element and the supporting lever in a series of relative positions as the seat part is raised out of the lower end position and when the seat part reaches an upper end position to set itself in a disengaged condition which is maintained until the seat part is lowered to a lower end position, in which automatic setting in the locking position again takes place. Thus, to adjust the height of the seat of this special embodiment, if a greater height thereof is desired, the seat part is merely gradually raised and the locking device engages in different positions. If it is desired to lower the said seat, it is raised to the upper end position, in which the locking device then disengages completely and allows the seat part to be lowered completely into the lower end position. The seat may then either remain in the lower end position, in which the locking device becomes operative again, or, it may also be brought into a somewhat higher setting by renewed raising to the desired position. Moreover, it is conceivable to have both a construction in which continuously variable locking takes place and, in particular, a constructional form in which the possibility of height adjustment in stages is provided, since adjustment of this kind is sufficient for the majority of cases.

In a special preferred constructional form the locking device comprises a toothed segment, a detent co-operating therewith and resiliently biassed towards a position of engagement with the toothed segment, and a disengaging element which acts on the detent in the upper end position of the seat part to disengage the detent from the toothed segment and is automatically disengaged from the detent as the seat reaches its lowermost position by means of a stud or the like actuating element carried by the part bearing the toothed segment.

A particularly simple constructional form of the height adjusting device is obtained when the connecting element is a transmission lever mounted to swing about the same axis as the supporting lever, the transmission lever having the toothed segment at its free end and the supporting lever carrying the detent. For reasons of symmetry and reliable operation, two transmission levers will preferably be provided and must then be arranged on both sides of the supporting lever.

It is advantageous if the seat further includes a disengaging plate having a butting face for the detent, the disengaging plate being swingably mounted on the supporting lever and having an opening in which an actuator element fixed to the transmission lever is movable between abutment surfaces bounding the opening, the arrangement being such that when the stud runs up against one abutment surface in the upper end position of the seat part the disengaging plate comes into operative engagement with the detent while when the stud runs up against the other abutment surface in the lower end position of the seat part the plate is disengaged and the detent released. A disengaging plate of this kind can be produced in a simple manner as stamped part. Furthermore, only two studs or pins are required for actuating and mounting the disengaging plate, namely one on the transmission lever and one on the supporting lever, so that extremely simple design of the device is obtained.

In order to avoid disconnection of the detent from the toothed segment for the purpose of raising the seat part and nevertheless obtain easy release of the detent, it is proposed that that edge of the detent which co-operates with the toothed segment and the corresponding flanks of the teeth of the toothed segment are chamfered on one side to permit automatic disengagement of the detent from the toothed segment upon relative shifting of the toothed segment and the detent in one direction.

As already mentioned, it is advantageous if a transmission lever with a toothed segment is arranged on both sides of the supporting lever. In this case, the detent is suitably formed by a bar extending through an opening in the supporting lever. In order to mount the detent in a simple manner with such a design and nevertheless obtain a uniform and symmetrical action on the two transmission levers, the detent should be urged into engagement with the toothed segments by two tension springs attached to the ends of the detent bar and to the transmission levers.

It is known that in seats having an understructure formed by two scissors each having two intersecting arms a particularly small over-all height of the understructure can be obtained. When height adjusting means according to the invention are employed in seats of such type, the construction is advantageously such that corresponding arms of the two scissors are rigidly interconnected by a shaft which serves as a pivot axis for the scissor arms and also as a bearing axis for the supporting lever and the transmission lever, the supporting lever or the transmission lever being fast with the shaft to move with the scissor arms. The entire height adjusting device then consists in principle only of the supporting lever and detent, the transmission lever and toothed segment and, of course, the associated springs. If the above-described simple operation shall be obtained, a disengaging plate in the special design mentioned must be provided. Obviously a very simple type of construction is obtained in this way, when using scissor-type understructures. Moreover the advantages of the low design, obtainable in particular with scissor-type understructures, are retained.

When using the height adjusting means of the invention with scissor-type understructures it is advantageous, if the supporting lever has at its free end a run-up cam which acts upon a sliding element displaceable against the action of the supporting spring means such that when the seat is loaded the swing of the supporting lever is converted into a linear motion of the sliding element and tensions the spring means. In seats with a scissor-type understructure, the use of such a supporting lever with a run-up cam allows practically horizontal installation of the spring, so that very small over-all heights can be achieved. Furthermore, the design of the spring-biassed means is very simple in comparison with known solutions. Indeed, to transmit the force from the spring to the scissor-type understructure, substantially only the sliding element connected to the spring and the supporting lever moved together with the understructure and one or more transmission levers are necessary. Another advantage of such a design of the springing device in a seat according to the invention is that the run-up cam may, of course, be variously shaped so as to obtain in this way a very definite spring characteristic, for example as to cause a comparatively small acting spring force in the first section of the path of movement, this spring force increasing progressively when the scissor-type understructure yields further.

It should be mentioned that the locking device must not be constructed in such a way that it is disengaged automatically in the uppermost position and engaged again in the lower end position. The locking device could for instance also be provided with a hand operated lever enabling disengagement and/or engagement also in positions between the upper and lower end positions respectively.

The invention will be more fully understood from the following description of a preferred embodiment, which is given by way of example, reference being made to the accompanying drawings, which are diagrammatic in each case and in which.

Figure 1:
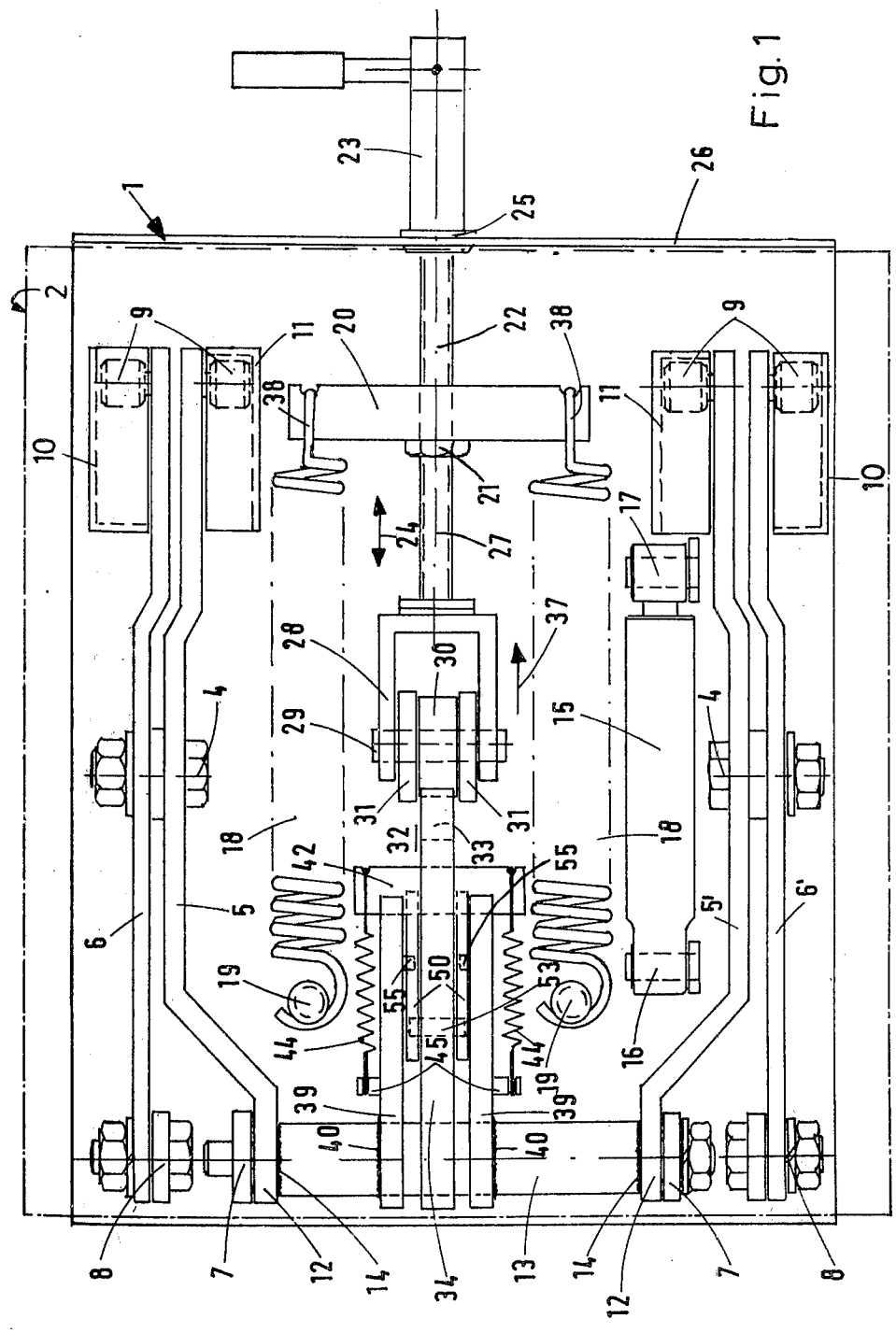
FIG. 1 is a plan view of the understructure of a vehicle seat with a springing device and a height adjustment.

The understructure of the seat shown in the drawing has a floor or base frame 1, which is intended to be fixed to the vehicle chassis, and a supporting frame 2 (shown in chain-dotted lines in FIG. 1), the seat part proper 3 being secured to the supporting frame 2. The floor frame 1 and the supporting frame 2 are interconnected by two scissors each formed by two intersecting arms 5, 6 and 5', 6', respectively, pivotally attached to one another by means of a connecting bolt 4. Those ends of the inner scissor arms 5, 5' forming a pair of scissor arms which are on the left in the drawing are each pivotally attached to the floor plate 1 at a bearing point 7. The corresponding ends of the outer scissor arms 6, 6' are articulated to the supporting frame 2 at bearing points 8, the supporting frame being formed, for example, by a plate. The other ends of the scissor arms 5, 5' and 6, 6' are equipped with rollers 9 which are movable in a manner known per se in guides 10 on the floor frame 1 and guides 11 on the supporting frame 2 parallel to the main plane thereof, so as to render possible in this way a variation in the angle between the scissor arms 5, 5' and 6, 6' for substabtially parallel raising and lowering of the supporting frame 2 with respect to the floor frame 1. Since this construction of the scissor-type understructure comprising the scissor arms 5, 5', 6, 6', the bearings 7, 8, the rollers 9 and the guides 10, 11, is generally known per se, a detailed description of the position of the individual parts, etc. will not be given.

FIG. 1 in particular shows clearly that the ends 12 of the pair of scissor arms 5, 5' which are articulated to the bearing points 7 are rigidly connected to one another by means of a shaft 13 formed by a tube and which is fixed, and more particularly welded, at both ends to the ends 12 at 14. In this way a coinciding movement of the two scissors formed by the arms 5, 6 and 5', 6' is obtained.

In order to damp shocks occurring on travelling through potholes or the like, a shock absorber 15 is inserted between the floor frame 1 and the supporting frame 2, one end 16, for example, of the shock absorber being articulated to the floor frame 1, while the other end 17 is articulated to the supporting frame 2.

In the embodiment shown, two tension springs 18 arranged parallel to one another in the area of the floor frame 1 serve for mutually spring-biassing the floor frame 1 and the supporting frame 2, the tension springs being attached at one end to a stud 19 or the like on the floor frame 1 (see FIG. 1). The other ends of the tension springs 18 engage the opposite ends of a bearing block 20 which is so mounted by means of a nut 21 on a threaded spindle 22 that on rotation of the threaded spindle 22 by means of a handle 23 it moves axially along the spindle 22 as shown by the arrow 24 in dependence upon the direction of rotation of the handle 23. In this way, as can easily be realized, the initial tension of the tension springs 18 can be varried for adaptation to different loads on the seat part 3. In order to form a certain end stop for the tension springs 18, the collar 25 of the handle 23 is supported against an edge flange 26 of the floor frame 1, to which end the threaded spindle 22 extends through a corresponding hole on the edge flange 26.

At its end remote from the handle 23 the threaded spindle 22 carries a fork 28 which can pivot about the longitudinal axis 27 of the spindle 22. Arranged close to the fore-ends of the legs of the fork 28 is a spindle 29 on which are mounted to be freely rotatable a supporting roller 30 and, on both sides of this supporting roller, two guide rollers 31 having a larger diameter compared with the supporting roller 30. The supporting roller 30 and the guide rollers 31 are likewise freely rotatable relative to one another, to which attention is drawn here once more. The guide rollers 31 run on the base 32 of the floor frame 1, which base serves as a guide, while the supporting roller 30 is held at a certain distance from the base 32 in consequence of its smaller diameter and can therefore rotate freely.

It is therefore apparent from the drawing in conjunction with the foregoing description that the supporting roller 30 is forced towards the shaft 13, i.e. to the left in the drawing, by the tension springs 18 via the fork 28, the threaded spindle 22 and the bearing block 20.

A run-up cam 33 at the free end of the supporting lever 34 acts on the supporting roller 30 (FIGS. 2 to 4), the supporting lever in the embodiment shown being mounted to be freely rotatable on the shaft 13 connecting the ends 12 of the scissors arms 5, 5'. Attention should be drawn at this point to the fact that a constructional form would also readily be conceivable wherein the supporting lever 34 would be connected to the shaft 13 to be rotationally fast therewith at its end remote from the run-up cam 33, in which case the height adjustment described hereinafter would then not be available.

To explain the basic principle of the mode of operation of the spring-biassing means in the illustrated construction of the seat understructure, there shall be assumed that the supporting lever 34 is rigidly connected to the shaft 13. In this case the supporting roller 30, which is forced to the left in the drawing by the springs 18, acts on the run-up cam 33 of the supporting lever 34, which is thereby forced upwardly into the position shown in solid lines in FIG. 2 and in FIGS. 3 and 4. When the supporting lever 34 is rigidly connected to the shaft 13, the pair of scissor arms 5, 5' also, of course, moves in the same direction under the action of the tension springs 18 and the supporting frame 2 will adopt its upper end position.

Figure 2:
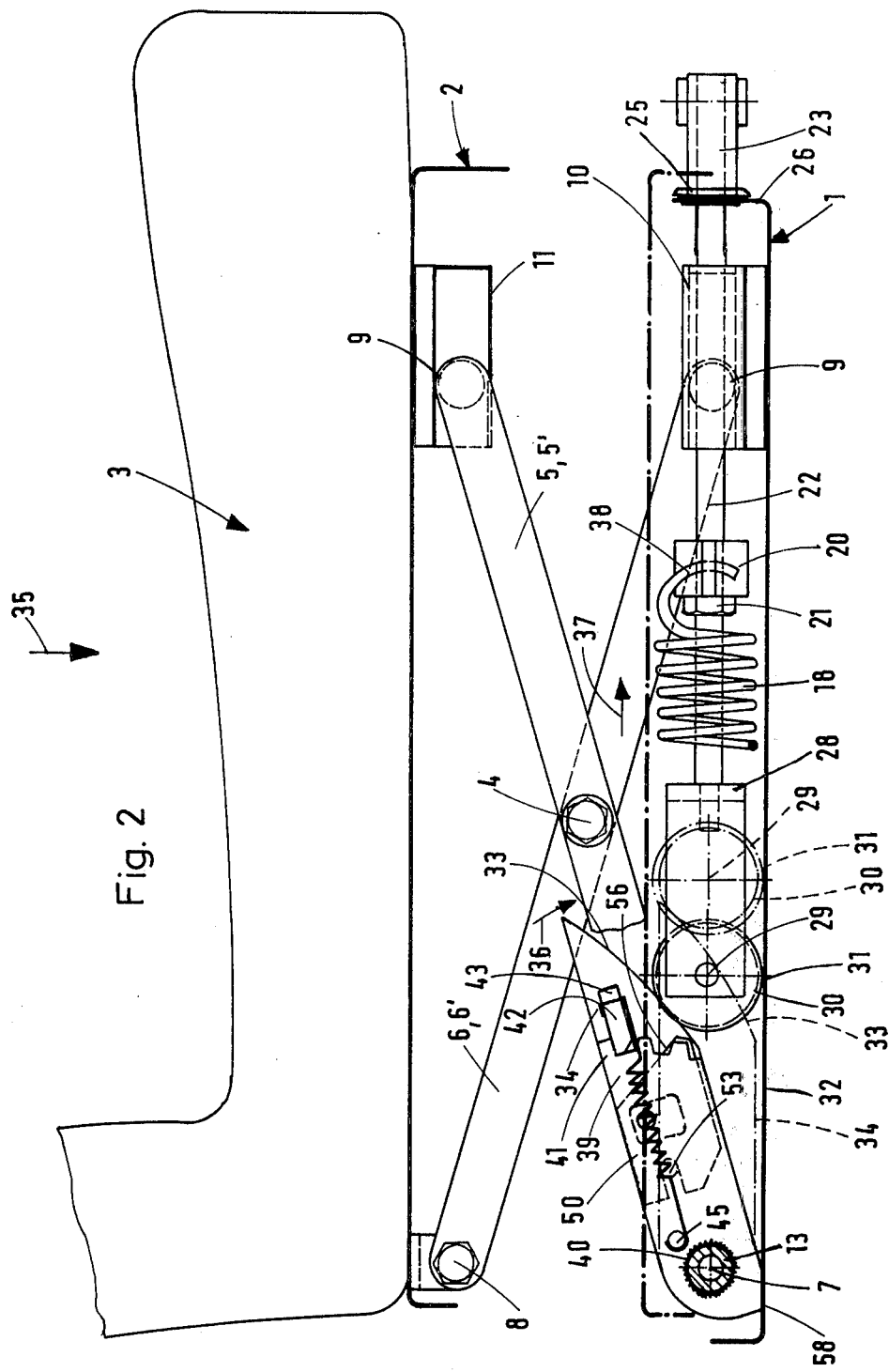
FIG. 2 is a side view of the vehicle seat understructure according to FIG. 1.

If a load acts on the seat part 3 in the direction of the arrow 35, this results in a swinging of the supporting lever 34 in the direction of the arrow 36, which may lead as far as the bottom end position of the supporting lever 34 which is shown in chain-dotted lines in FIG. 2. During this downward movement of the supporting lever 34 in the direction of the arrow 36, the fork 28 is shifted to the right in the drawing (arrow 37) by the co-operation of the run-up cam 33 with the supporting roller 30. This shifting movement of the fork 28 is transmitted via the threaded spindle 22 to the bearing block 20, as a result of which the points of attachment 38 of the tension springs 18 are likewise shifted correspondingly and the tension springs 18 are stretched to take the load in the direction of the arrow 35. The righthand end position of the supporting roller 30 is shown in chain-dotted lines in FIG. 2.

It can easily be seen that with such a construction the spring characteristic can be varried to adapt to different operating conditions by varying the shape of the run-up cam 35 at the free end of the supporting lever 34. Furthermore, when biassing means of this kind are employed, the understructure of the seat can of course be constructed to be very low, since the springs 18 which generally require a large amount of room can be arranged parallel to the floor frame 1.

The opportunity should be taken here to point out that during the springing action the threaded spindle 22 moves to and fro in the direction of the arrow 24, as already mentioned. It can therefore be expected that the handle 23 will likewise move correspondingly, i.e. it will project to a greater or lesser extent beyond the edge flanges 26 of the floor frame 1, its movement taking place in rhythm with the oscillation of the seat part 3. This circumstance is not disturbing, however, since the seat part 3 normally projects still further beyond the edge flange 26 of the floor frame 1, as shown in FIG. 2.

According to the invention, however, the supporting lever 34 is not rigidly connected to the shaft 13, as assumed hereinbefore. On the contrary, it is mounted to be loosely rotatable on the shaft 13 and connecting elements are provided for transmitting the rotary movement of the scissor arms 5, 5' to the supporting lever 34. In the shown embodiment, two transmission levers 39 arranged on both sides of the supporting lever 34 and welded to the shaft 13 at 40 (see in particular FIG. 4) serve as connecting elements. These transmission levers 39 are provided with a toothed segment 41 at their free ends, the design of the teeth being particularly clear from FIG. 4.

A detent 42 which is of substantially bar-like form and extends through an opening 42 in the supporting lever 34 cooperates with the toothed segment 41. The detent 42 is forced towards the toothed segment 41 by tension springs 44 attached to its two ends and arranged on the outside of the transmission levers 39. Pins 45 are provided on the transmission levers 39 for securing the ends of the tension springs 44.

Figure 3:
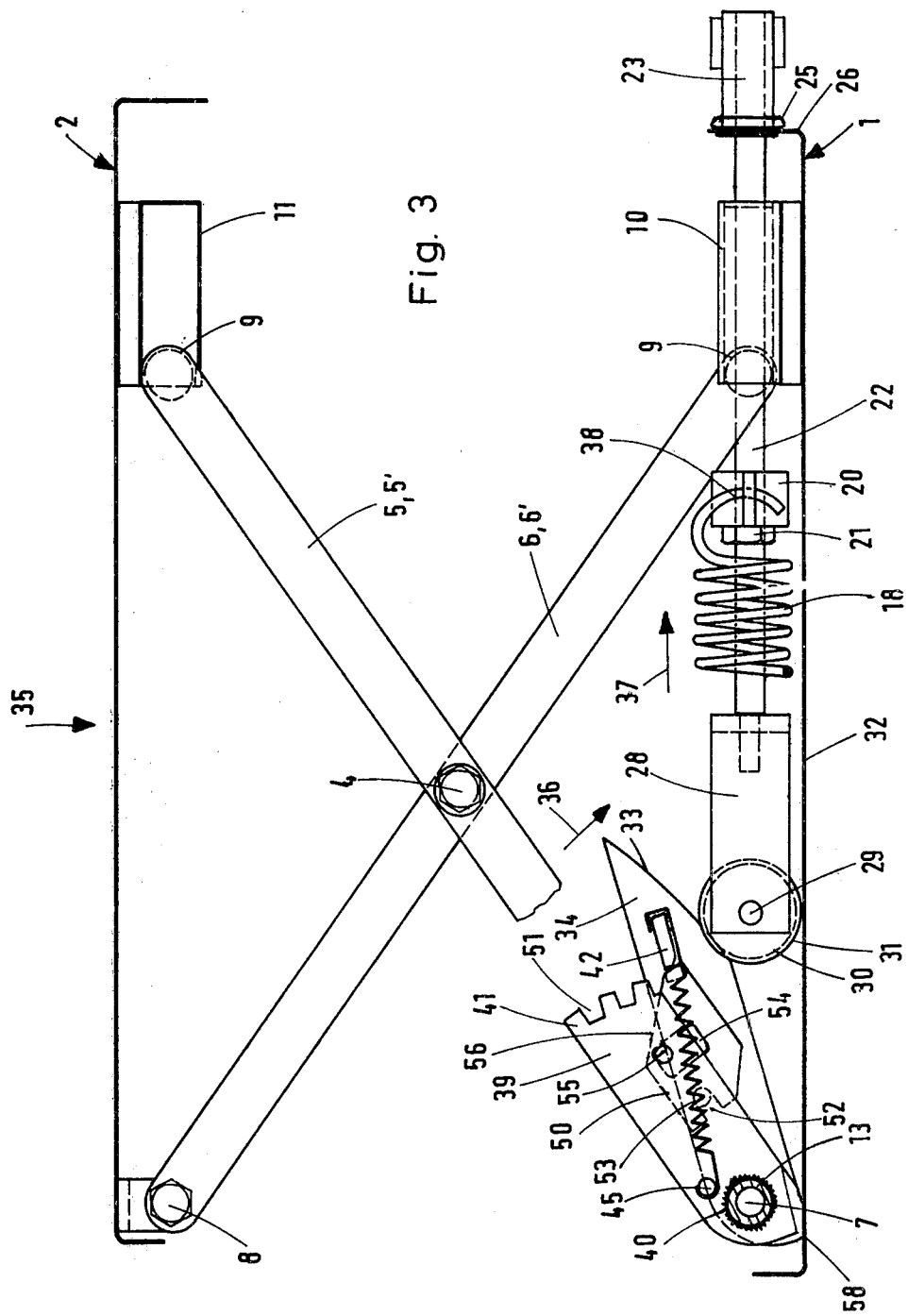
FIG. 3 is likewise a side view of the understructure in a position which is changed with respect to FIG. 2.

With the aid of the locking device formed by the detent 42 and the toothed segments 41 of the transmission levers 39, it is possible to lock the supporting lever 34 in different angular positions with respect to the transmission levers 39 and the scissor arms 5, 5', as can be seen by comparison of FIGS. 2 and 3. If the detent 42 is located in the uppermost notch of the toothed segment (FIG. 2), the scissor arms 5, 5' adopt a comparatively small angle with respect to the base plate 32 of the floor frame 1 in the unloaded state of the seat. If, on the other hand, the detent 42 is engaged in one of the notches of the toothed segment 41 located lower down (whereby a position similar to that of FIG. 3 results), a larger angle is obtained between the scissor arms 5, 5' and the base plate 32 of the floor frame 1 in the unloaded state. Consequently, the supporting frame 2 is at a greater distance from the floor frame 1. Thus, by engaging the detent 42 with different notches of the toothed segment 41, it is possible to adjust the height of the seat part 3 with respect to the floor frame 1. On loading of the seat part 3 in the direction of the arrow 35, the supporting lever 34 moves in the manner described, irrespective of the particular angular position between the supporting lever 34 and the transmission levers 39, and in so doing shifts the supporting roller 30 with tensioning of the spring means (to the right in the drawing).

The locking device between the supporting lever 34 and the transmission levers 39 is designed in a very special manner in the embodiment shown in the drawing.

Figure 4:
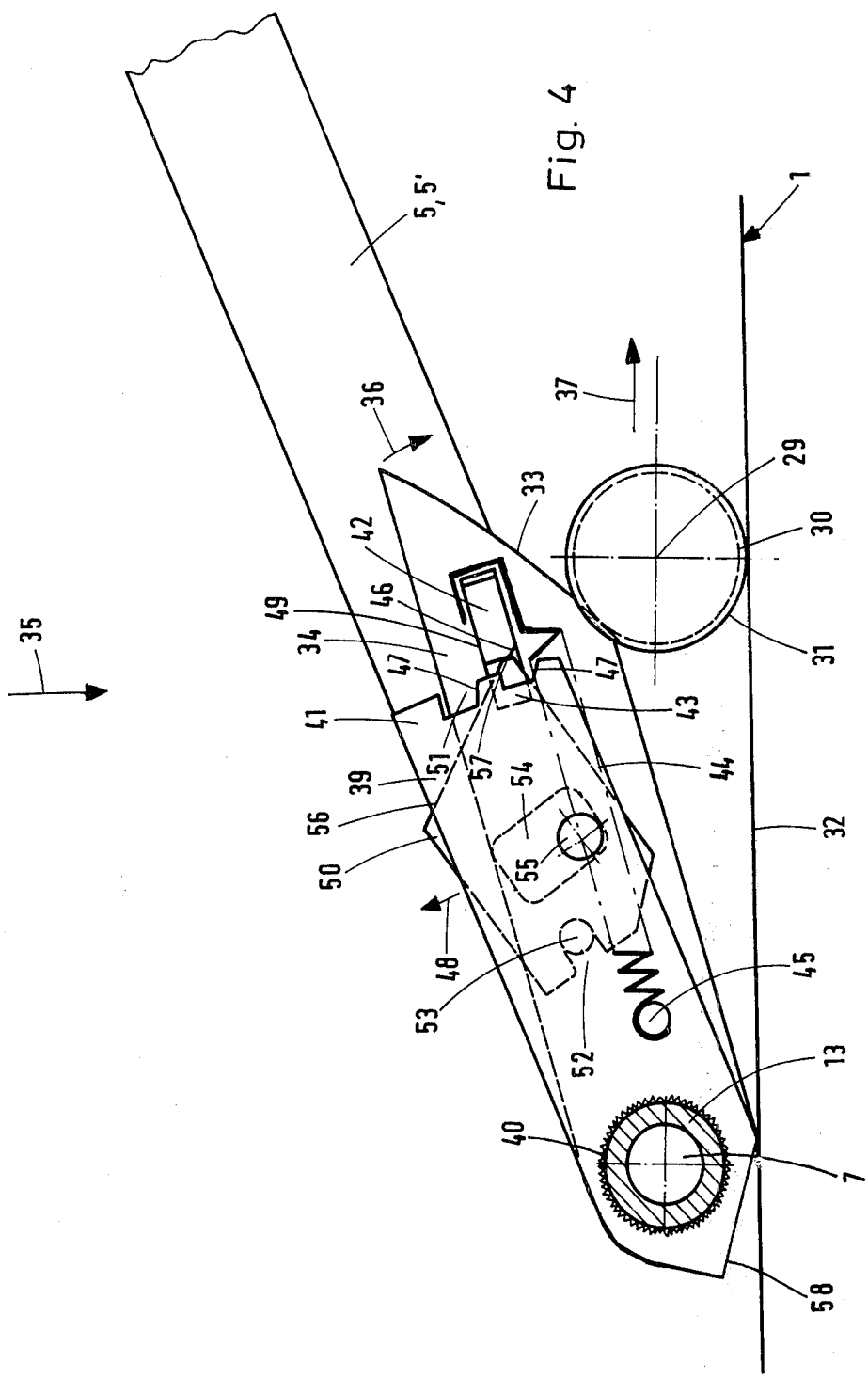
FIG. 4 shows a detail of FIGS. 2 and 3 on a larger scale and in a position which is once again changed.

In fact, FIGS. 2 to 4 show clearly that that edge of the detent 42 which comes into engagement with the toothed segment 41 is chamfered on its underside at 46. Similarily, the flanks 47 (FIG. 4) of the individual teeth of the toothed segments 41 of the transmission levers 39 are also chamfered if necessary, so that on the seat part 3 being raised, whereby the scissor arms 5, 5' and consequently also the transmission levers 39 are swung in the directon of the arrow 48, the detent 42 is automatically disengaged from the teeth of the toothed segments 41. As soon as the seat part 3 is released, on the other hand, the top 49 of the detent is applied against those flanks of the individual teeth of the toothed segments which are opposite the flanks 47, the detent 42 being pulled into the position of engagement by the springs 44. In this way it is therefore possible, by merely raising the seat part 3, to lock the seat in stages in different positions, which are of increasing height, however, with respect to the floor frame 1.

In the seat understructure illustrated, the possibility of lowering the seat part 3 is provided by two disengaging plates 50 respectively associated with the transmission levers 39 and which, in consequence of their special form, ensure that on the seat part 3 being raised beyond the uppermost locking position (FIG. 3) the detent 42 is held in a position in which it cannot engage the teeth of the toothed segments 41. The detent 42 then remains in this position until the seat part 3 and with it the supporting frame 2 have been lowered to such an extent that the detent 42 can engage the uppermost notch 51 of the toothed segment 41.

The disengaging plate 50, the configuration of which is particularly clear from FIG. 4, has a slot 52 in its edge directed towards the shaft 13, the slot having resting therein a pin 53 connected to the supporting lever 34 (FIG. 1). Moreover, the disengaging plate 50 has an opening 54, each of the openings being engaged by a stud 55 on the associated transmission lever 39. Finally, the front edge 56 of the disengaging plate 50 is inclined in the manner visible from the drawing and angled at the lower end to form the abutment surface 57 for the detent 42.

The disengaging plate 50 operates in the following manner:

As long as the detent 42 is opposite one of the notches of the toothed segments 41 of the transmission levers 39, the disengaging plate 50 does not act on the detent 42. It then adopts the position which can be seen in FIG. 2, in which the stud 55 is nearly resting against the top edge of the opening 54.

If the supporting frame 2 is now raised to such an extent that the detent 42 leaves the limits of the toothed segments 41 downwardly, the detent 42 runs at its chamfer 46 on to the front edge 56 of the disengaging plate 50, which is held in a predetermined position by the stud 55 resting against the top edge of the opening 54 and by the pin 53 in the slot 52. In this way, the detent 42 moves to be abutment surface 57 (FIG. 3).

If the supporting frame 2 is now lowered again, the detent 42 continues to be forced against the abutment surface 57 of the disengaging plate 50 by the springs 44. The result of this is that the disengaging plate 50 remains connected to the supporting lever 34 in regard to movement, i.e. it does not move because in fact the supporting lever 34 is also held in the upper end position shown in FIG. 3 by the supporting roller 30. It should be pointed out here that this end position may be defined by an abutment 58 at the articulated end of the supporting lever 34.

During the movement of the transmission levers 39, the studs 55 connected to these levers move downwardly in the openings 54 away from their top edges, and in fact until they reach the position shown in FIG. 4. At this instant, the stud 55 acts on the bottom edge of the openings 54 and thereby moves the disengaging plate 50 downwardly. As a result of this movement the abutment surface 57 of the disengaging plate 50 comes out of engagement with the front edge of the detent 42. The detent 42 can thereupon then engage in the top notch 51 of the toothed segment 41. This process follows immediately on the position of the parts shown in FIG. 4. The seat is then locked in the lower end position without any special manipulation having been required.

If the driver wishes to bring the seat into a somewhat higher position, he merely raises the seat part 3 until a renewed locking action takes place between the detent 42 and one of the notches of the toothed segment 41.

Thus, in the seat shown, adjustment of the height of the seat part 3 is effected in a simple manner by the driver merely raising the seat to increase the height and waiting for it to lock appropriately. If, on the other hand, the driver wishes to lower the seat, he raises it beyond the uppermost locking position, then lowers it completely — with the detent held out of engagement — and then raises it again into the desired position. Thus, the height adjustment can be effected extremely rapidly without employing any special manipulation, it being necessary, moreover, to point out that only very few extremely simple designed components are required for the height adjustment, which will result in a low degree of susceptibility to trouble and low cost.

As already mentioned the locking device can of course also be constructed in another way so that for lowering the seat raising of it beyond the uppermost locking position is not necessary. Disengagement can in this case for instance be achieved by a suitable hand operated lever.

We claim:

1. A seat of adjustable height having a seat part coupled by a connecting element to a supporting lever acted upon by supporting spring means, the lever being swingable against the action of the supporting spring means by a load acting on the seat part, the connecting element being adjustable relative to the supporting lever to change the height of the seat part, the improvement which comprises a locking device to lock said connecting element to said supporting lever in different relative positions, said locking device being comprised of a toothed segment, a detent co-operating with said toothed segment resiliently biased towards a position of engagement with said toothed segment, and a disengaging element which may act upon said detent to disengage said detent from said toothed segment, said locking device locking said connecting element and said supporting lever in a series of relative positions as said seat part is raised and wherein said locking device is placed in a disengaged condition when said seat part reaches an upper end position and is maintained in such disengaged condition until said seat part is lowered to a lower end position.

2. A seat as claimed in claim 1 wherein the detent is caused to be automatically disengaged from the tooth segment as the seat reaches an upper end position by means of an actuating element disposed on a member on which said toothed segment is mounted.

3. A seat as claimed in claim 2 wherein the connecting element is a transmission lever mounted to swing about the same axis as the supporting lever, the transmission lever having the toothed segment at its free end and the supporting lever carrying the detent.

4. A seat as claimed in claim 3 and further including a disengaging plate having a butting face for the detent, the disengaging plate being swingably mounted on the supporting lever and having an opening in which an actuator element fixed to the transmission lever is movable between abutment surfaces bounding the opening, the arrangement being such that when the stud runs up against one abutment surface in the upper end position of the seat part the disengaging plate comes into operative engagement with the detent while when the stud runs up against the other abutment surface in the lower end position of the seat part the plate is disengaged and the detent released.

5. A seat as claimed in claim 3 and further comprising a second transmission lever with a toothed segment, the two transmission levers being arranged on opposite sides of the supporting lever and the detent being in the form of a bar extending through an opening in the supporting lever.

6. A seat as claimed in claim 5 wherein the detent is urged into engagement with the toothed segments by two tension springs attached to the ends of the detent bar and to the transmission levers.

7. A seat as claimed in claim 3 wherein the seat part is mounted on two scissors each comprising two intersecting arms, corresponding arms of the two scissors being rigidly interconnected by a shaft which serves as a pivot axis for the scissor arms and also as a bearing axis for the supporting lever and the transmission lever, one of said levers being fast with the shaft to move with the scissor arms.

8. A seat as claimed in claim 2 wherein the edge of the detent and the corresponding flanks of the teeth of the toothed segment are chamfered on one side to permit automatic disengagement of the detent from the toothed segment upon relative shifting of the toothed segment and the detent in one direction.

9. A seat as claimed in claim 1 wherein the supporting lever has at its free end only a run-up cam which acts upon a sliding element displaceable against the action of the supporting spring means such that when the seat is loaded the swing of the supporting lever is converted into a linear motion of the sliding element and tensions the spring means.

10. The seat as defined in claim 9 wherein said supporting spring means comprises two tension springs arranged substantially parallel to the direction of movement of said sliding element with said sliding element and said run-up cam being disposed therebetween.

11. The seat as defined in claim 9 wherein said sliding element comprises a supporting roller rotatably mounted in a carrier and engaging said run-up cam and a pair of guide rollers mounted one on each side of said supporting roller and having a larger diameter than said supporting roller, said guide rollers resting against a guide surface on a seat frame.

12. The seat as defined in claim 9 wherein said sliding element is coupled to a threaded spindle engaging a threaded bearing block for axial adjustment of said bearing block, said bearing block being attached to one end of said supporting spring means, the other end of said supporting spring means being attached to a floor frame of said seat, said threaded spindle extending through an opening in said frame and being such accessible for adjustment.

* * * * *